(12) United States Patent
Lee

(10) Patent No.: US 10,255,829 B2
(45) Date of Patent: Apr. 9, 2019

(54) IN-SITU TRAINING APPARATUS, METHOD AND SYSTEM

(71) Applicant: Medtronic Holding Company Sàrl, Tolochenaz (CH)

(72) Inventor: Stephen W Lee, San Jose, CA (US)

(73) Assignee: Medtronic Holding Company Sàrl, Tolochenaz (CH)

( * ) Notice: Subject to any disclaimer, the term of this patent is extended or adjusted under 35 U.S.C. 154(b) by 221 days.

(21) Appl. No.: 15/289,688

(22) Filed: Oct. 10, 2016

(65) Prior Publication Data

US 2018/0102068 A1 Apr. 12, 2018

(51) Int. Cl.
- *G09B 23/28* (2006.01)
- *G09B 23/30* (2006.01)
- *G09B 19/24* (2006.01)

(52) U.S. Cl.
CPC ......... *G09B 23/306* (2013.01); *G09B 19/24* (2013.01); *G09B 23/285* (2013.01)

(58) Field of Classification Search
CPC .... G09B 23/28; G09B 23/285; G09B 23/286; G09B 23/30; G09B 23/206
USPC .......... 434/262, 267, 269, 272, 274
See application file for complete search history.

(56) References Cited

U.S. PATENT DOCUMENTS

| | | | | |
|---|---|---|---|---|
| 5,425,644 A * | 6/1995 | Szinicz | ............... | G09B 23/28 434/267 |
| 5,947,743 A * | 9/1999 | Hasson | ............ | G09B 23/286 434/262 |
| 6,422,874 B1 * | 7/2002 | Green | ............... | G09B 23/32 434/256 |
| 6,908,309 B2 * | 6/2005 | Gil | ............... | G09B 23/30 434/267 |
| 7,403,883 B2 * | 7/2008 | Heruth | ............... | G09B 23/30 424/141.1 |
| 7,895,899 B2 * | 3/2011 | Kelly | ............... | A61B 5/1126 73/760 |
| 9,418,574 B2 * | 8/2016 | Park | ............... | G09B 23/32 |
| 9,666,102 B2 * | 5/2017 | East | ............... | A61B 17/1671 |
| 9,734,732 B2 * | 8/2017 | Jabbour | ............... | G09B 23/285 |
| 9,842,515 B1 * | 12/2017 | TenBrink | ............... | G09B 23/32 |
| 9,959,786 B2 * | 5/2018 | Breslin | ............... | G09B 23/30 |
| 2007/0161872 A1 | 7/2007 | Kelly | | |
| 2016/0225288 A1 | 8/2016 | East | | |

FOREIGN PATENT DOCUMENTS

DE 102011115106 A1 4/2013
WO 2011110139 A1 9/2011

OTHER PUBLICATIONS

European Search Report dated Oct. 10, 2017, 7 pages.

* cited by examiner

*Primary Examiner* — Kurt Fernstrom

(57) ABSTRACT

A training device simulating ablation of a disc space between adjacent vertebral bodies. A heating apparatus includes an upper surface. A lower plate is provided on the upper surface of the heating apparatus. An upper substantially transparent plate is fixed by a frame above the lower plate. The upper plate is etched with an outline of a vertebral body. Fixed in position proximate the lower frame, the upper plate holds a biological material compressed between the plates. Tool-holding clamps, attached to the frame, are positioned to insert a surgical tool, in a proper location and orientation, into the biological material between the upper and lower plates.

15 Claims, 6 Drawing Sheets

IN-SITU TRAINING APPARATUS, METHOD AND SYSTEM

BACKGROUND OF THE INVENTION

Field of the Invention

The present invention relates to an in-situ training apparatus, method, and system of ablation, biopsy extractions, and cement plasty, including but not limited to RF ablation, in vertebral bodies. More particularly, the present invention provides training to health care professionals in an accurate placement of access tools, trocars, and other instruments, such as RF probes in desired locations in a patient.

Description of the Related Art

It is known to train health care professionals in the field of surgery and particularly in the field of ablation in a disc space between two adjacent vertebral bodies. Existing training devices, methods, and systems available in this field, however, often have proven to be insufficiently thorough, resulting in occasional unnecessary pain suffered by certain patients due to ablation procedures performed by inadequately trained health care professionals, subsequently resulting in claims for medical malpractice. Existing training devices, methods and systems do not teach sufficiently accurate placement of access tools, trocars, and RF probes at desired locations in the disc space. Existing training devices, methods, and systems also are incapable of providing in-situ measurement and visualization of separations in tool, trocar, and RF probe angle and depth control between tools, trocars, and probes. Existing training devices, methods, and systems also fail to accurately simulate human body temperature.

SUMMARY OF THE INVENTION

The present invention is an in-situ apparatus, method, and system for training for surgery and particularly useful for training for ablation in vertebral bodies which obviates one or more of the shortcomings in the prior art. While a preferred embodiment of the present invention described herein includes training associated with ablation in a disc space between two adjacent vertebral bodies, and more preferably RF ablation, it is within the scope of the disclosure of this application that such an in-situ apparatus, method, and system is useful for training associated with other particular surgical procedures including but not limited to cryo-ablation, laser ablation, cement plasty, and biopsy extractions. Moreover, while ablation in a disc space between two adjacent vertebral bodies is a preferred embodiment of the present invention, the in-situ apparatus, method, and system covers all soft tissue and bone tissue applications and need not be limited to the vertebral bodies of the spine. By way of example only, the apparatus, method, and system as applicability to the pelvic area, femur, tibia, and the joints of the body.

In one preferred embodiment of the invention, an in-situ training apparatus is provided which trains health care professionals in accurate placement of tools, trocars, and RF probes in desired locations between adjacent vertebral bodies.

In one preferred embodiment of the invention, the training apparatus includes a base, a heating apparatus supported by the base, a lower plate provided on the upper surface of the heating apparatus, an upper substantially transparent plate etched with an outline of one of the adjacent vertebral bodies, and a frame supported by the base, this frame being configured to support the upper plate in a position proximate the lower plate, wherein the upper plate, supported in the position proximate the lower plate, holds the biological material between the upper plate and the lower plate, wherein the upper and lower plates simulate the adjacent vertebral bodies, and the biological material simulates the disc space between the adjacent vertebral bodies.

In one preferred embodiment of the invention, a training apparatus further includes at least one hinged holding clamp defined on the frame, the hinged holding clamp being configured to support one of a cannula having defined therein an open axial lumen and an open distal end pointing toward the biological material for insertion therethrough of a trocar into the biological material, and a tool, trocar, or RF ablation probe.

These and other objects of the present invention will be apparent from review of the following specification and the accompanying drawings.

DETAILED DESCRIPTION OF THE PREFERRED EMBODIMENT

Figure 1:
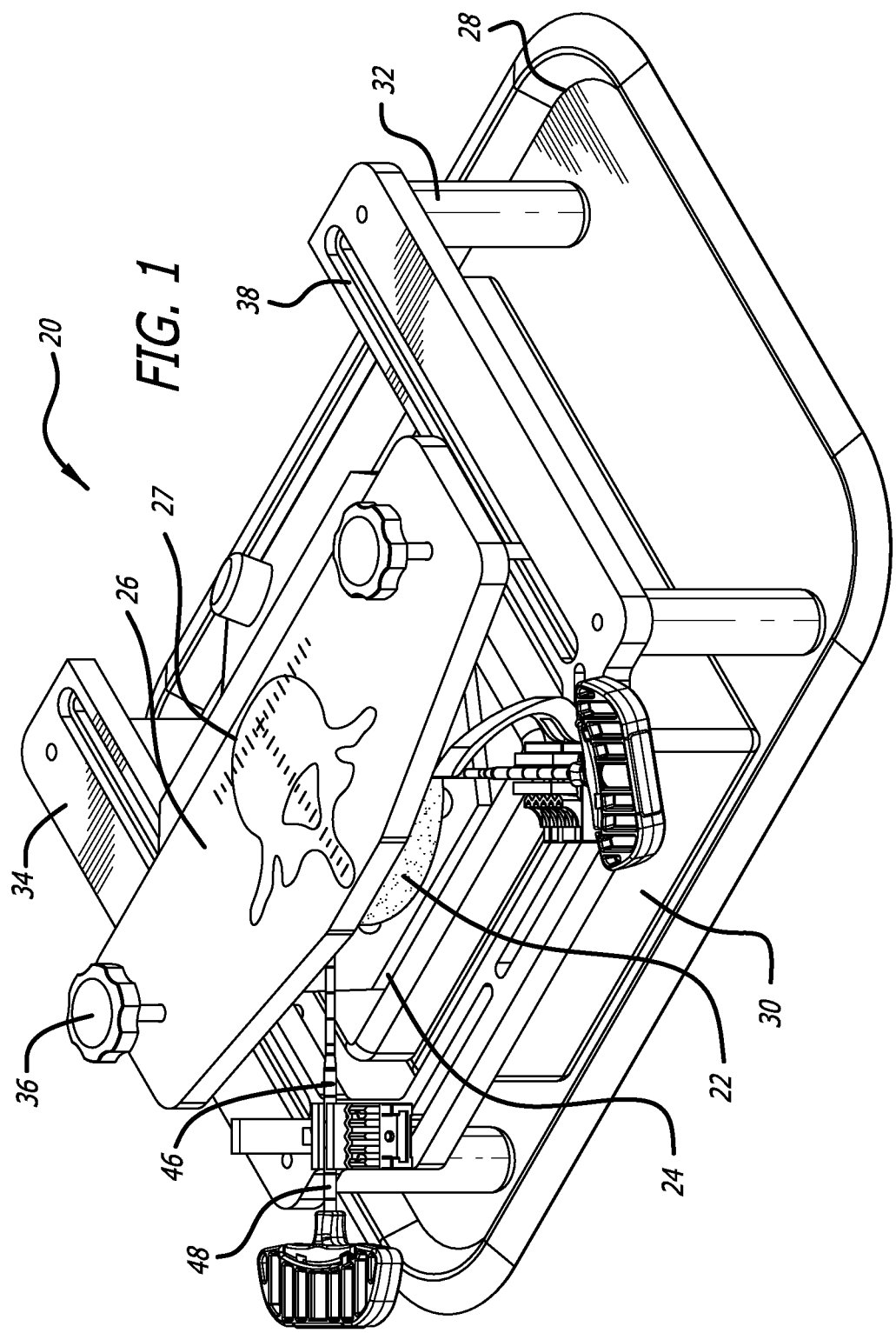
FIG. 1 is a perspective view of an in-situ training apparatus in accordance with the invention, for simulating ablation of a disc space between adjacent vertebral bodies.
Figure 2:
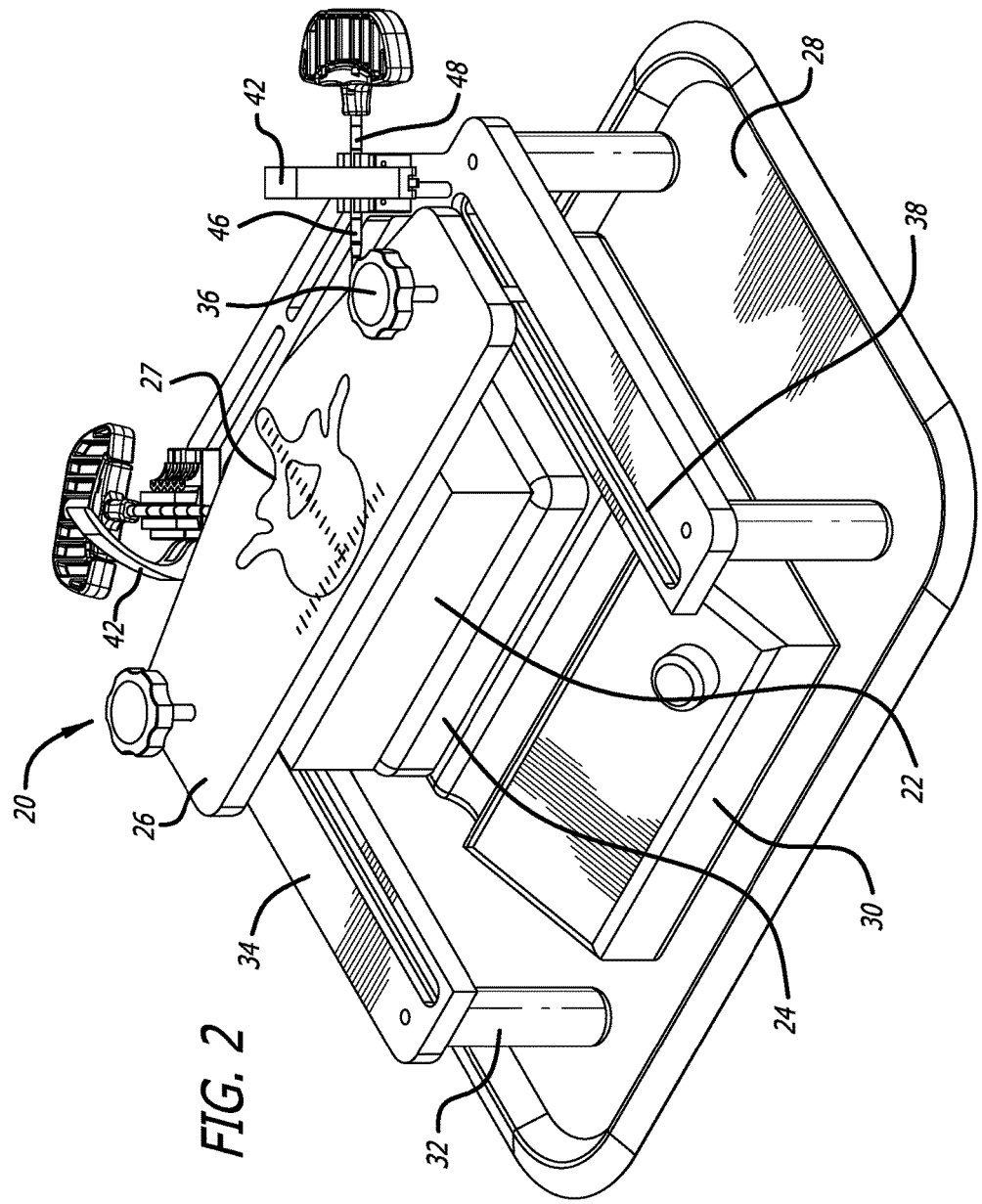
FIG. 2 is a partial perspective view of a base of an in-situ training apparatus in accordance with the invention, for simulating ablation of a disc space between adjacent vertebral bodies.
Figure 3:
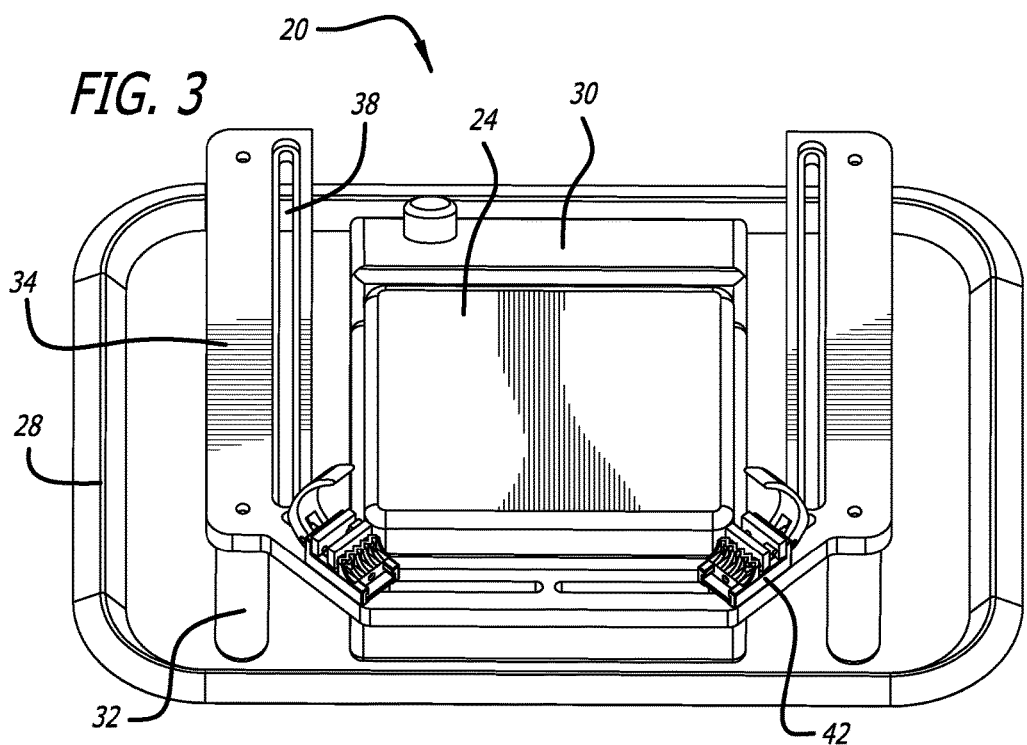
FIG. 3 is an upper perspective view of a base in an in-situ training apparatus in accordance with the invention, for simulating ablation of a disc space between adjacent vertebral bodies, prior to assembly of the device.
Figure 4:
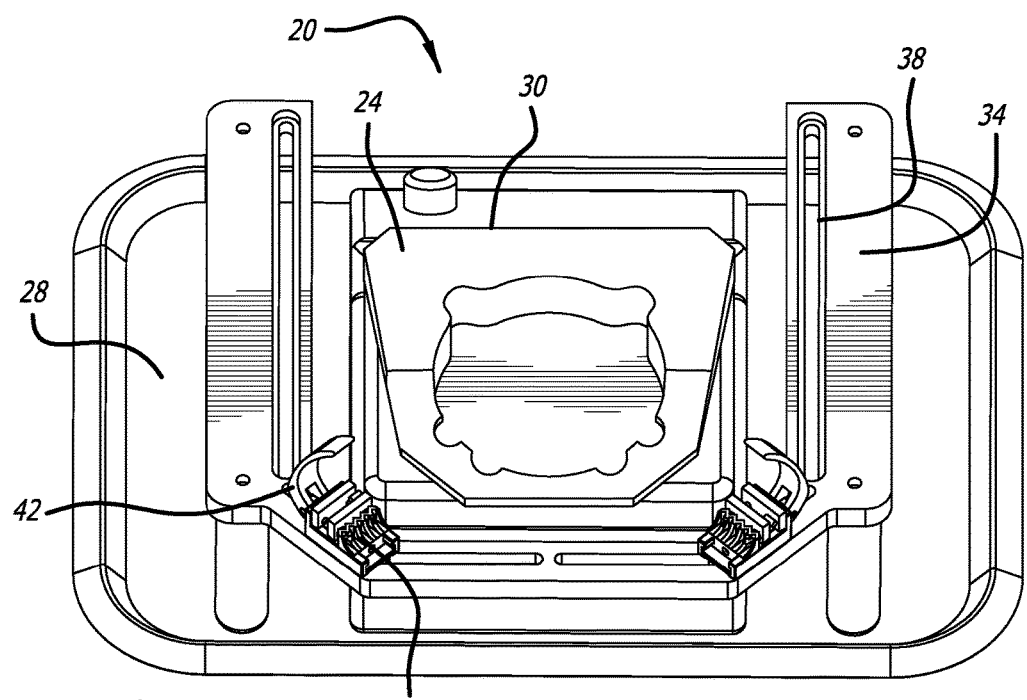
FIG. 4 is an upper perspective view of a base, a heating element, a lower plate, and a frame in an in-situ training apparatus in accordance with the invention, for simulating ablation of a disc space between adjacent vertebral bodies, during assembly of the device.
Figure 5:
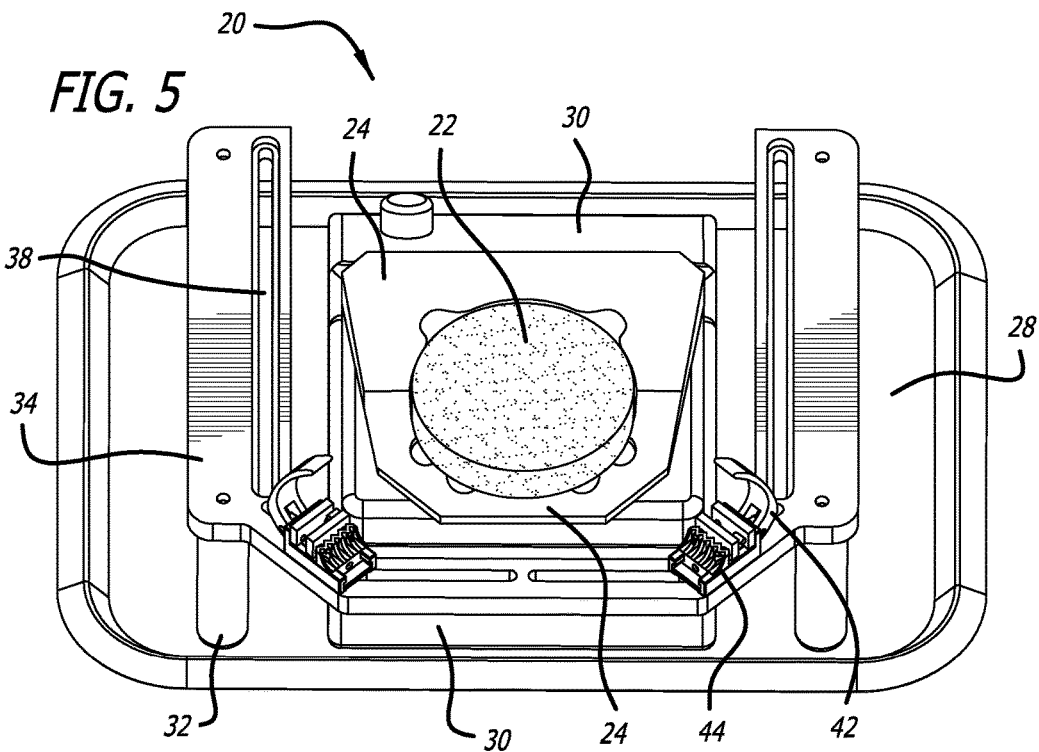
FIG. 5 is an upper perspective view of a base, a heating element, a lower plate, a frame, and biological matter in an in-situ training apparatus in accordance with the invention, for simulating ablation of a disc space between adjacent vertebral bodies, during assembly of the device.
Figure 6:
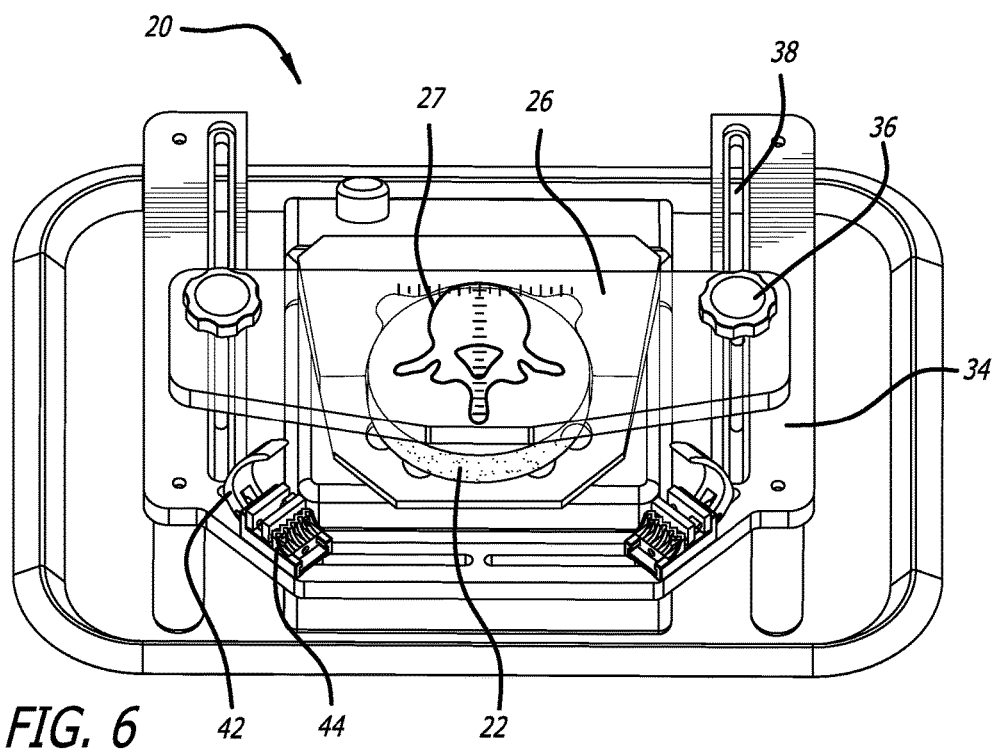
FIG. 6 is an upper perspective view of a base, a heating element, a lower plate, a frame, biological matter, and an upper plate in an in-situ training apparatus in accordance with the invention, for simulating ablation of a disc space between adjacent vertebral bodies, during assembly of the device.
Figure 7:
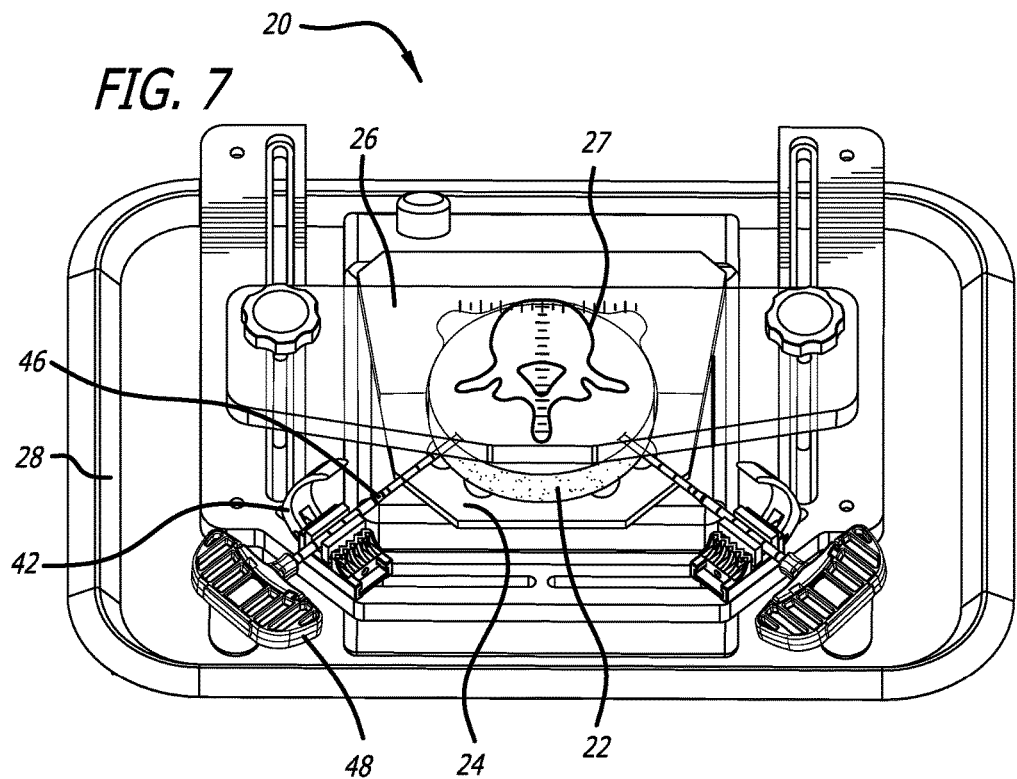
FIG. 7 is an upper perspective view of a base, a heating element, a lower plate, a frame, biological matter, an upper plate, and cannulas being positioned in place in open holding clamps for insertion into the biological matter in an in-situ training apparatus in accordance with the invention, for simulating ablation of a disc space between adjacent vertebral bodies, during assembly of the device.
Figure 8:
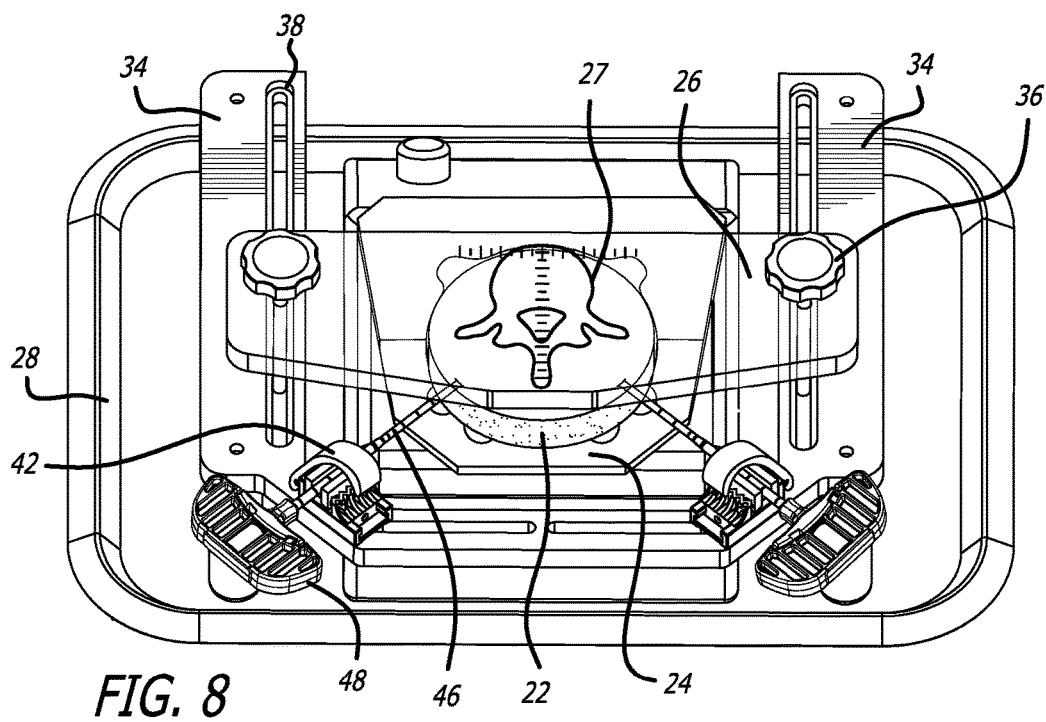
FIG. 8 is an upper perspective view of a base, a heating element, a lower plate, a frame, biological matter, an upper plate, and cannulas being clamped in place in closing holding clamps, inserted into the biological matter, in an in-situ training apparatus in accordance with the invention, for simulating ablation of a disc space between adjacent vertebral bodies, during assembly of the device.
Figure 9:
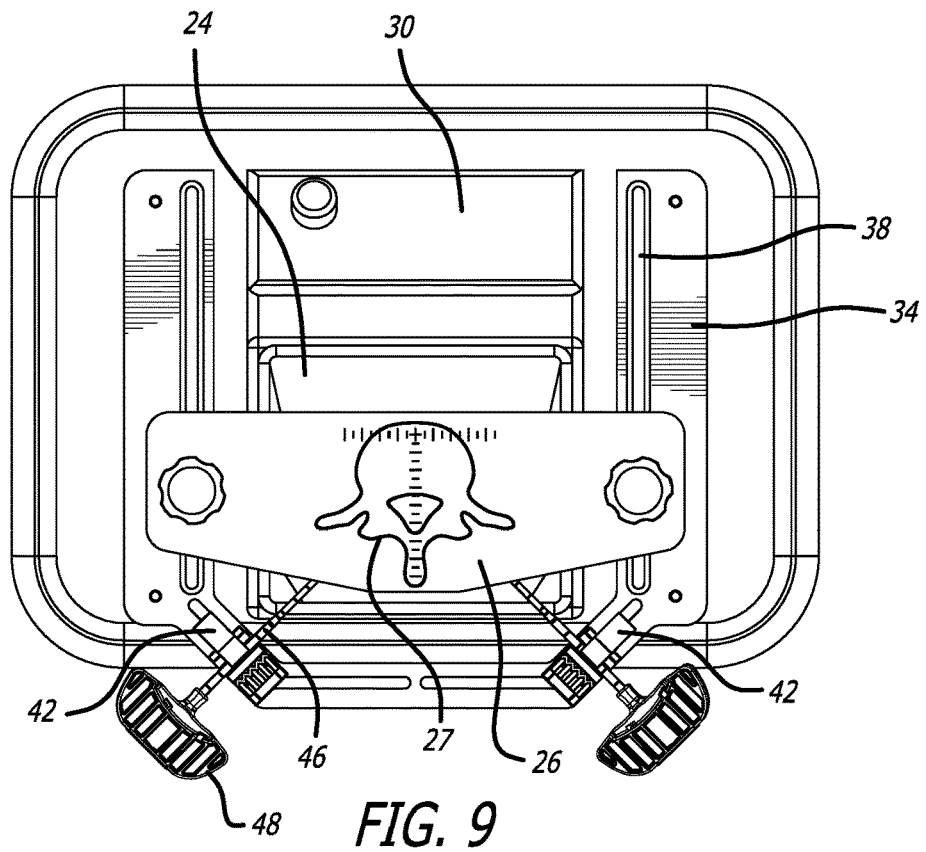
FIG. 9 is an upper perspective view of a base, a heating element, a lower plate, a frame, biological matter, an upper plate, and cannulas clamped in place in closed holding clamps, inserted into the biological matter, in an in-situ training apparatus in accordance with the invention, for simulating RF ablation of a disc space between adjacent vertebral bodies, during assembly of the device.

The exemplary embodiments of the apparatus and related methods of use disclosed are discussed in terms of an apparatus and a method for training healthcare professionals in the field of ablation in a disc space between two adjacent vertebral bodies of a patient's spine.

In one preferred embodiment, an in-situ training apparatus 20 is configured for simulating ablation of the disc space between adjacent vertebral bodies. Referring to FIGS. 1-4, the in-situ training apparatus 20 is configured to allow a surgeon to be trained in RF ablation or other surgical methods on biological material 22, simulating disc space, positioned between two plates, including a lower plate 24 and an upper plate 26. At least the upper plate 26 is transparent, and scored to include an outline 27 substantially simulating an appearance of a vertebral body. If the in-situ training apparatus 20 in another preferred embodiment is used for training for another type of surgery, the upper plate 26, would be scored or otherwise marked to represent another part of the patient's anatomy and be used in association with particular instruments used in that particular surgery. Such an example of scoring or marking would include but not be limited to either an image representative of a portion of the pelvic area, a femur, a tibia, or one of the joints of the body.

Figure 10:
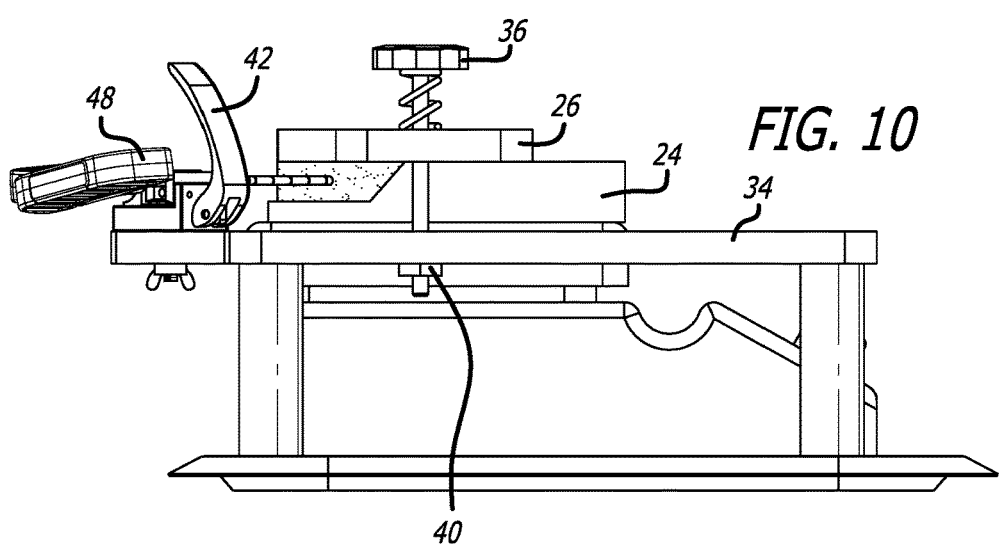
FIG. 10 is a side cross-sectional view of FIG. 9.

In one preferred embodiment, the training apparatus 20 includes a base 28, preferably a concave tray. Referring to FIGS. 1-4, the base 28 supports a heating apparatus 30, and legs 32 of the frame 34. The lower plate 24 is supported on an upper surface of the heating apparatus 30. The frame 34 is configured to support the upper plate 26 above and proximate the lower plate 24. Referring to FIG. 10, the upper plate 26 is held in place by insertion of fasteners 36 through apertures defined in the upper plate 26, aligned with slots 38 defined in the frame 34 into lock nuts 40 below the frame 34.

In one preferred embodiment, referring to FIGS. 5-10, the frame 34 includes at least one holding clamp 42, adapted to pivot between an open position and a closed position via a hinge 44. In one preferred embodiment, referring to FIGS. 7-10, holding clamp 42 is configured to hold a cannula 46 therein. The cannula 46 includes a central axial lumen (not shown) sized to insert a trocar 48 through the lumen and into the biological material 22. The invention, however is not limited only to insertion of a trocar 48 into the biological material 22. The positioning of the holding clamp 42, and the resultant positioning of the cannula 46 by the clamp ensures proper positioning and orientation of the trocar 48 during insertion of the trocar 48 into the biological material 22 between the upper plate 26 and the lower plate 24. In this manner, training is provided to health care professionals in the proper positioning, proper orientation, and proper angle of insertion of the trocar 48 into an actual disc space between adjacent vertebral bodies.

In one preferred embodiment, the at least one holding clamp 42 is configured to hold an RF ablation device, or another spinal surgical tool (not shown) in the proper position and orientation for insertion into the biological material 22 between the upper plate 26 and the lower plate 24, thereby providing training to health care professionals in the proper positioning, proper orientation, and proper angle of insertion of the RF ablation device or the other surgical tool into an actual disc space between adjacent vertebral bodies.

In one preferred embodiment, a method of simulating ablation of the disc space between adjacent vertebral bodies includes utilizing the in-situ training apparatus 20 described above.

The biological material 22 is prepared for use in the simulation. Persons of ordinary skill in the art recognize that standard commercially available chicken parts, e.g., chicken breasts, are suitable for use as the biological material 22. The chicken parts/biological material 22 maybe maintained in a frozen state until performance of the method of simulating ablation of the disc space. At this time, the biological material 22 is thawed, and heated on the heating apparatus 30 to normal human body temperature. The heated biological material is placed on an upper surface of the lowest plate 24. The upper plate 26 is next fixed in place by inserting fasteners 36 through the slots 38 in the support frame 34 and into the lock nuts 40 located below the support frame 34. When the fasteners 36 are secured in the lock nuts 40, the biological material 22 is held by compression between the upper plate 26 and the lower plate 24. Tool-holding clamps 42, provided on the legs 32 of the support frame 34, are moved to their respective open positions on their respective hinges 44. Various surgical tools can be inserted into each open tool-holding clamp 42, e.g., cannulas 46, RF ablation probes, and other surgical tools as necessary. The tool-holding clamps 42 are next moved to their respective closed positions on their respective hinges 44. At least one trocar 48 is inserted through an axial lumen of the at least one cannula 46. Referring to FIGS. 7-10, the positioning of the tool-holding clamps 42 controls the positioning and orientation for insertion into the biological material 22 between the upper plate 26 and the lower plate 24, thereby providing training to health care professionals in the proper positioning, proper orientation, and proper angle of insertion of the at least one trocar 48, the RF ablation device, or any other surgical tool into an actual disc space between adjacent vertebral bodies.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. An in-situ training apparatus simulating ablation of a disc space between adjacent vertebral bodies, the apparatus comprising:
    a base;
    a heating apparatus supported by the base, the heating apparatus including an upper surface;
    a lower plate provided on the upper surface of the heating apparatus;
    an upper substantially transparent plate etched with an outline of one of the adjacent vertebral bodies; and
    a frame supported by the base, the frame being configured to support the upper plate in a position proximate the lower plate;
    wherein the upper plate, supported in the position proximate the lower plate, holds a biological material between the upper plate and the lower plate.

2. The apparatus of claim 1, wherein the frame includes at least one tool-holding clamp.

3. The apparatus of claim 2, further comprising cannula having an open distal end, wherein the at least one tool-holding clamp is configured to hold at least the cannula with the open distal end thereof pointing toward the biological material held between the upper plate and the lower plate.

4. The apparatus of claim 3, further comprising a tracer, wherein the cannula defines a lumen configured to receive the trocar therethrough, the tracer being insertable through the lumen and the open distal end into the biological material.

5. The apparatus of claim 2, wherein the at least one tool-holding clamp is configured to hold at least an RF ablation device.

6. The apparatus of claim 1, wherein the upper plate is configured to be fixed in position proximate the lower plate by at least one fastener inserted through an aperture in the upper plate into at least one lock-nut provided in the lower plate.

7. A method of simulating RF ablation of a disc space between adjacent vertebral bodies, comprising:
   utilizing an in-situ training apparatus, the training apparatus comprising:
      a base;
      a heating apparatus supported by the base, the heating apparatus including an upper surface;
      a lower plate provided on the upper surface of the heating apparatus;
      an upper substantially transparent plate etched with an outline of one of the adjacent vertebral bodies; and
      a frame supported by the base, the frame being configured to support the upper plate in a position proximate the lower plate, and including at least one tool-holding clamp;
      wherein the upper plate, fixed in position proximate the lower plate holds a biological material between the upper plate and the lower plate;
   placing the biological material on the lower plate;
   fixing the upper plate in position above the lower plate, thereby holding the biological material therebetween;
   locking at least a cannula in place in the at least one tool-holding clamp, the at least a cannula including an axial lumen and an open distal end, configured for insertion of a trocar therethrough;
   inserting a trocar through the lumen and the open distal end of the at least one cannula, and into the biological matter.

8. The method of claim 7, further comprising locking at least an RF ablation probe in the at least one holding clamp.

9. The method of claim 7, further comprising heating the biological material with the heating apparatus to a temperature simulating human body temperature.

10. An in-situ training apparatus simulating ablation of a disc space between adjacent vertebral bodies, the apparatus comprising:
    a base;
    a lower plate positioned with respect to the base;
    an upper substantially transparent plate etched with an outline of one of the adjacent vertebral bodies; and
    a frame supported by the base, the frame being configured to support the upper plate in a position proximate the lower plate;
    wherein the upper plate, supported in the position proximate the lower plate, serves in holding a biological material between the upper plate and the lower plate.

11. The apparatus of claim 10, wherein the frame includes at least one tool-holding clamp.

12. The apparatus of claim 11, further comprising a cannula having an open distal end, wherein the at least one tool-holding clamp is configured to hold at least the cannula with the open distal end thereof pointing toward the biological material held between the upper plate and the lower plate.

13. The apparatus of claim 12, further comprising a trocar, wherein the cannula defines a lumen configured to receive the trocar therethrough, the trocar being insertable through the lumen and the open distal end into the biological material.

14. The apparatus of claim 11, wherein the at least one tool-holding clamp is configured to hold at least an RF ablation device.

15. The apparatus of claim 10, wherein the upper plate is configured to be fixed in position proximate the lower plate by at least one fastener inserted through an aperture in the upper plate into at least one lock-nut provided in the lower plate.

* * * * *

UNITED STATES PATENT AND TRADEMARK OFFICE
CERTIFICATE OF CORRECTION

PATENT NO. : 10,255,829 B2
APPLICATION NO. : 15/289688
DATED : April 9, 2019
INVENTOR(S) : Stephen W Lee Page 1 of 1

It is certified that error appears in the above-identified patent and that said Letters Patent is hereby corrected as shown below:

On the Title Page

In item (72), under "Inventor", in Column 1, Line 1, delete "Stephen W Lee," and insert -- Stephen W. Lee, --, therefor.

In the Claims

In Column 4, Line 66, in Claim 3, delete "comprising" and insert -- comprising a --, therefor.

In Column 5, Line 4, in Claim 4, delete "a tracer," and insert -- a trocar, --, therefor.

In Column 5, Line 6, in Claim 4, delete "tracer" and insert -- trocar --, therefor.

Signed and Sealed this
Eighth Day of October, 2019

Andrei Iancu
*Director of the United States Patent and Trademark Office*